US005283668A

United States Patent [19]

Hiramatsu

[11] Patent Number: 5,283,668

[45] Date of Patent: Feb. 1, 1994

[54] IMAGE READING APPARATUS WITH IMAGE SENSOR HAVING SELECTIVELY READABLE SEGMENTS

[75] Inventor: Akira Hiramatsu, Yokohama, Japan

[73] Assignee: Canon Kabushiki Kaisha, Tokyo, Japan

[21] Appl. No.: 739,492

[22] Filed: Aug. 2, 1991

[30] Foreign Application Priority Data

Aug. 28, 1990 [JP] Japan ................................ 2-224354

Sep. 18, 1990 [JP] Japan ................................ 2-246158

[51] Int. Cl.[5] ................................ H04N 1/04

[52] U.S. Cl. ................................ 358/474; 358/486

[58] Field of Search ............... 358/471, 474, 483, 486, 358/494; H04N 1/04

[56] References Cited

U.S. PATENT DOCUMENTS 4,760,466 7/1988 Nakamura ........................ 358/494

4,833,544 5/1989 Sato et al. ........................ 358/287

4,876,612 10/1989 Honma et al. ........................ 358/474

4,918,542 4/1990 Nagashima et al. ................ 358/451

4,926,251 5/1990 Sekizawa et al. ................... 358/80

4,954,913 9/1990 Kajita ................................ 358/474

*Primary Examiner*—Stephen Brinich

*Assistant Examiner*—Kim Yen Vu

*Attorney, Agent, or Firm*—Fitzpatrick, Cella, Harper & Scinto

[57] ABSTRACT

An image reading apparatus of the type which reads an original image by dividing it into a plurality of stripe-like areas each having a fixed width, wherein image reading is performed by reading an original image a plurality of times in a reading width which corresponds to an integral multiple of the fixed width, and wherein image signals, having a fixed width and corresponding to different respective areas, are sequentially selected in synchronism with the image reading performed a plurality of times, from among the totality of the image signals obtained by the reading.

5 Claims, 9 Drawing Sheets

59 CONTROL UNIT

56 DRIVE CONTROL UNIT

DRIVER 52

CCD 5

AMP 53

A/D 54

REGION CONTROL UNIT 55

OUT

M 10

APPROX.16mm

MAIN SCANNING DIRECTION

5

$a_n$ $a_3$ $a_2$ $a_1$

A

CONTROL UNIT
59
DRIVER
52
CCD
5
AMP
53
A/D
54
REGION CONTROL UNIT
55
OUT
DRIVE CONTROL UNIT
56
M
10

210
M
214b
209a
202
206a
201
203
204
205
207a
214a
211
213a
207b
281
MAIN SCANNING DIRECTION
280
282
212
208
206b
209b
SUB-SCANNING DIRECTION
213b
216a
215
216a
217
M

CONTROL UNIT
259
DRIVER
252
CCD
205
AMP
253
A/D
254
REGION CONTROL UNIT
255
HEAD DRIVE SECTION
261
RECORDING HEAD
262
DRIVE CONTROL UNIT
256
M
217
M
210

IMAGE READING APPARATUS WITH IMAGE SENSOR HAVING SELECTIVELY READABLE SEGMENTS

BACKGROUND OF THE INVENTION

1. Field of the Invention

The present invention relates to an image reading apparatus which is applicable, for example, to a copying machine or a printer.

2. Descriptions of the Related Art

A recording apparatus has conventionally been known in which stripe-like image portions are successively recorded on a recording medium by performing scanning with a recording head which is equipped with a recording section having a fixed width. In a so-called digital copying machine, which has appeared on the market, a recording apparatus of the above-mentioned type is combined with an image reading apparatus which is adapted to read an original image by means of a reading device, like a CCD image sensor, and emit an electrical signal corresponding to the read image.

The assignee of the subject application has proposed in U.S. Pat. Nos. 4,876,612, 4,918,542, 4,954,913, etc. image reading systems according to which an original image is divided into a plurality of stripe-like areas which are successively read by an image sensor having a reading width smaller than the width of the original.

As shown in FIG. 2, the reading means 100 of such an image reading apparatus consists of a small-sized CCD, which is large enough to read an area having a width corresponding to the recording width of the recording head (e.g., approximately 16 mm). When reading an original image, the reading means 100 is moved, in synchronism with the printing/recording movement of the recording head, in the direction indicated by the arrow Y (the main scanning direction) while illuminating the original, thereby reading a predetermined area of the original. Then, the reading means 100 is moved in the direction indicated by the arrow X (the sub-scanning direction) so as to read the next area of the original. In this way, the entire original image is read.

FIG. 1 is a perspective view of an image reading apparatus of the type described above.

The apparatus shown includes a main scanning unit 101, which is composed of a CCD sensor, an illumination system for illuminating the original, a projection system for projecting the original image onto the CCD sensor, which sequentially converts the projected light image to electrical signals, etc. This main scanning unit 101 is supported by a pair of rails 102*a* and 102*b* in such a manner as to be movable in the main scanning direction and is moved in this direction by means of a motor 103 and a wire 104.

The main scanning unit 101, the rails 102*a* and 102*b*, the motor 103, and the wire 104 are carried by a scanning carriage 105 and constitute as a whole a sub-scanning unit 110.

The sub-scanning unit 110 is supported by a pair of rails 111*a* and 111*b* in such a manner as to be movable in the sub-scanning direction, and is intermittently moved in synchronism with the main scanning, a predetermined distance at one time, by means of wires 112*a* and 112*b* which are driven by a motor 114.

The above-described conventional image reading apparatus has the following problems: First, in moving the reading position of the CCD sensor stepwise in the sub-scanning direction to perform successive reading, the distance the sub-scanning unit is fed at one time may vary, with the result that some unevenness is generated in the boundaries between adjacent sub-scanning areas (indicated by the broken lines of FIG. 2). Such unevenness will also result from a poor adjustment of the projecting magnification portion of the optical system for projecting original images onto the CCD, i.e, the reading sensor. Thus, a very high level of precision is required of the sub-scanning feeding mechanism, and, at the same time, the optical system must be adjusted very accurately, resulting in rather high costs.

Furthermore, moving the scanning unit a plurality of times in the sub-scanning direction is likely to involve a lack of uniformity in illumination, which will cause unevenness in density between sub-scanning areas at a period corresponding to the recording width, resulting in poor image quality.

SUMMARY OF THE INVENTION

This invention has been made with a view to solving the problems mentioned above. It is accordingly an object of this invention to provide an image reading apparatus of the type which reads an original image by dividing it into a plurality of stripe-like areas having a fixed width, wherein the generation of unevenness in density or discontinuity in the boundaries between adjacent scanning areas is avoided, thus making it possible to perform image reading in a satisfactory fashion.

Another object of this invention is to reduce the number of times the reading position is moved over the original image and to avoid as far as possible the disturbance of the image due to such movement of the reading position.

Still another object of this invention is to make it possible to obtain, with a simple construction and in a satisfactory manner, an image signal representing an original image portion and having a width corresponding to the width of a recorded image portion.

According to a first aspect of the present invention, an image reading apparatus of the type which reads an original image by dividing it into a plurality of stripe-like areas each having a fixed width, includes a reading device for reading an original a plurality of times, each reading having a reading width which corresponds to an integral multiple of said fixed width, and for outputting image signals for each said reading. A selection circuit is provided for sequentially selecting, in synchronism with the image reading performed said plurality of times, certain image signals from among those output from said reading device during each reading, said certain image signals corresponding to said fixed width and representing different areas of said reading device for each said reading.

According to a further aspect of the present invention, an image reading apparatus of the type which reads an original image by dividing it into a plurality of stripe-like areas having a fixed width, includes an image sensor for reading an original using a reading width corresponding to an integral multiple of said fixed width, and for outputting image signals for each said reading width. First moving structure moves the reading position of the image sensor in the main scanning direction, and second moving structure moves the reading position of the image sensor in the sub-scanning direction each time the reading position of the image sensor has been moved a fixed plural number of times in the main scanning direction. Selection circuitry is provided for selecting, in synchronism with the movement of the image sensor the plural number of times in the main scanning direction, predetermined image signals from among the image signals of each reading width, said predetermined image signals corresponding to said fixed width and respectively corresponding to different areas of said image sensor for each said reading width.

According to yet a further aspect of the present invention, an image reading apparatus includes a reading device for reading an original image, said reading device further comprising a plurality of sequential image reading segments, each said segment being selectively readable. Selection circuitry is provided for selectively reading any one of said plurality of sequential image reading segments. Preferably, the selection circuitry sequentially reads the plurality of sequential image reading segments, each reading of a different segment respectively corresponding to a different area of the original image.

The above and other objects and effects of the present invention will become apparent from the following description.

DESCRIPTION OF THE PREFERRED EMBODIMENTS

Embodiments of the present invention will now be described in detail with reference to the accompanying drawings.

Figure 1:
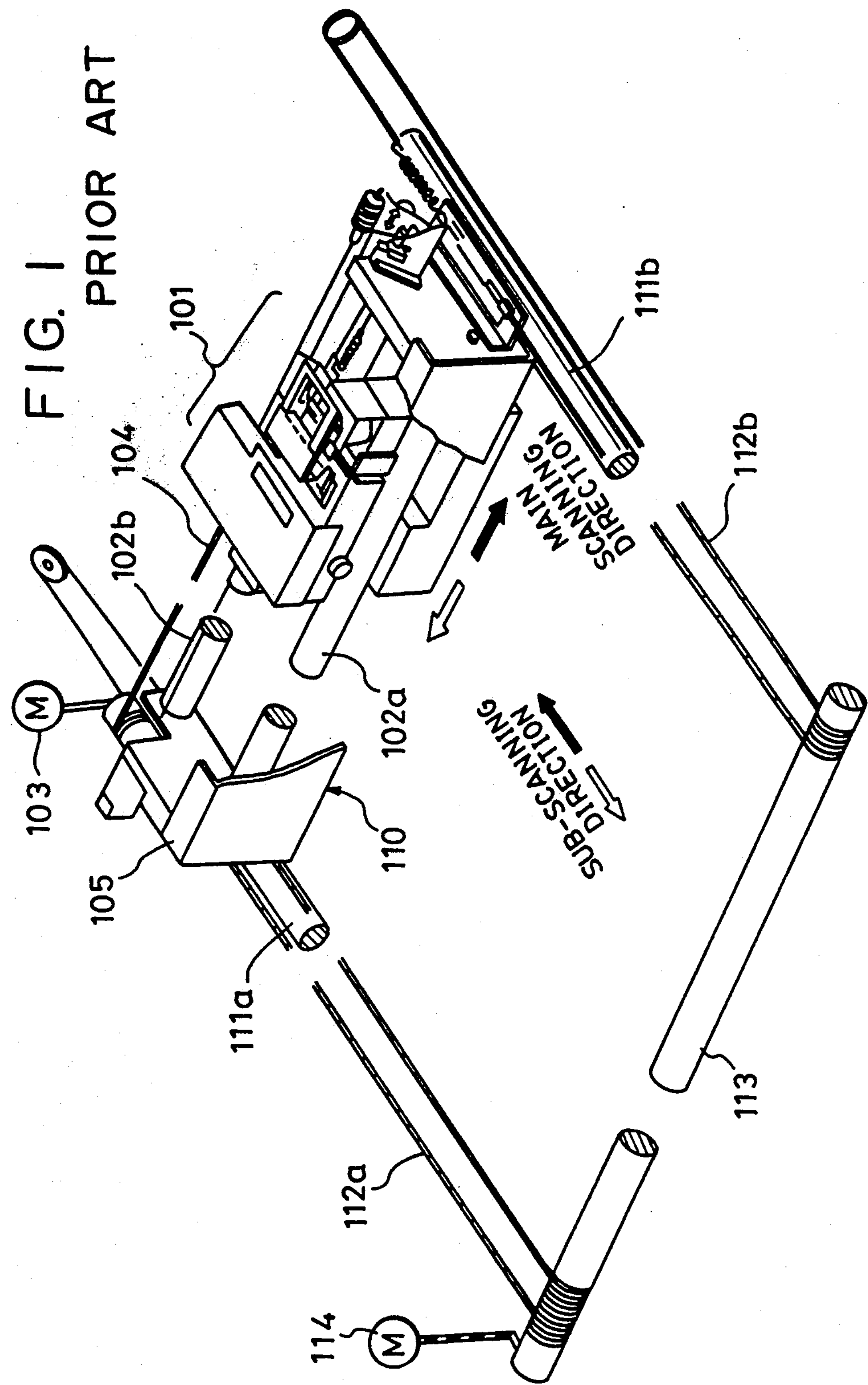
FIG. 1 is a diagram showing the construction of a conventional image reading apparatus.
Figure 2:
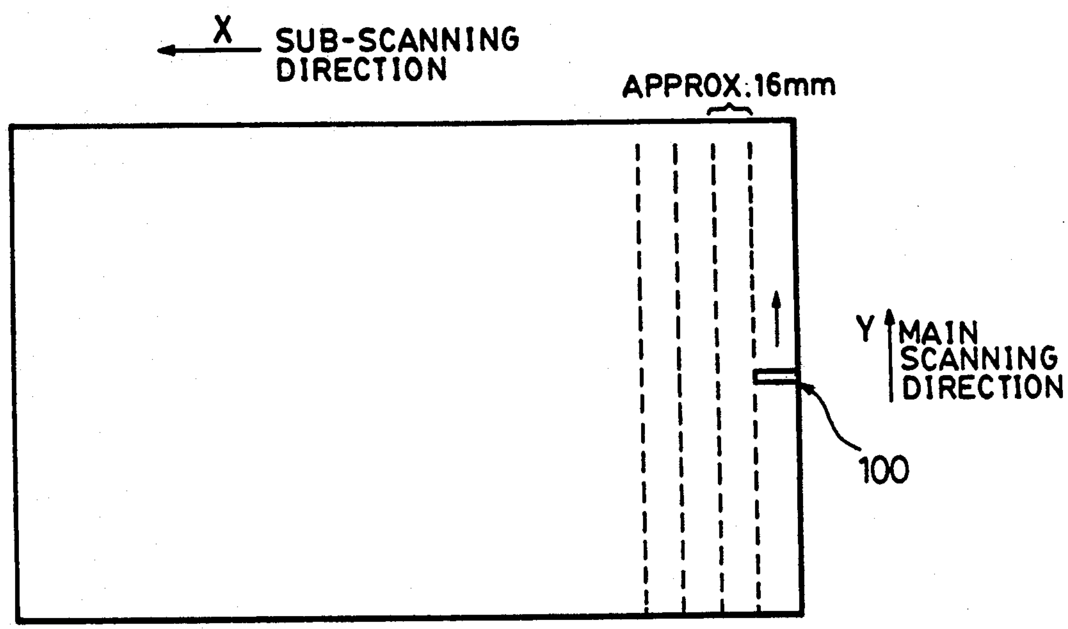
FIG. 2 is a diagram illustrating the image reading operation performed by the apparatus shown in FIG. 1.
Figure 3:
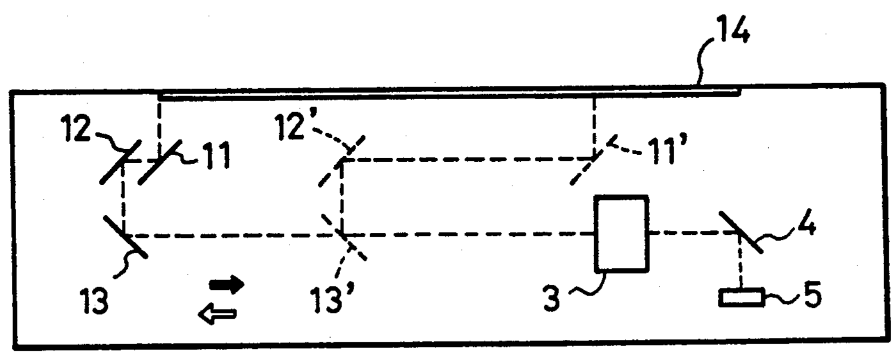
FIG. 3 is a schematic diagram illustrating the construction of an image reading apparatus in accordance with the present invention.
Figure 4:
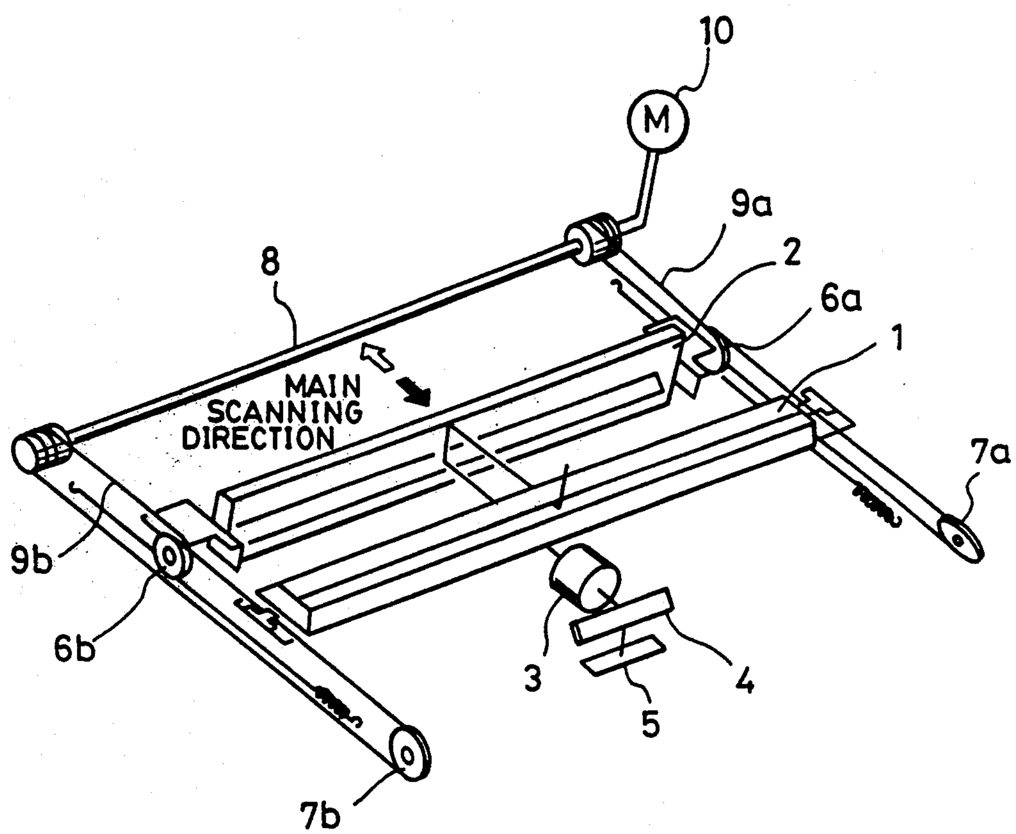
FIG. 4 is a diagram showing the internal structure of the image reading apparatus of FIG. 3.

FIGS. 3 and 4 are a schematic diagram and an inner perspective view, respectively, showing an image reading apparatus in accordance with this invention. The apparatus shown comprises: a glass 14 on which an original is placed with its image-side face down; a first mirror stand 1 including a first mirror 11, a second mirror stand 2 including second and third mirrors 12 and 13, a projection lens 3 for projecting a light image from the original onto a CCD (line image sensor) 5 described below, and a fourth mirror 4 for directing the light transmitted through the projection lens 3 to the CCD 5. The original image is transmitted by way of the first mirror stand 1, the second mirror stand 2, the projection lens 3, and the fourth mirror 4 before it is projected onto the CCD 5. The image reading length of the CCD 5 is sufficiently larger than (more than two times) the image recording length of the recording head. That is, the number of reading pixels (light receiving elements) on the CCD 5 is sufficiently larger than the number of recording pixels on the recording head.

A pair of scanning rails (not shown) fixed to the apparatus body, support the first and second mirror stands 1 and 2 in such a manner that they can move in the main scanning direction.

The apparatus further includes pulleys *6a* and *6b* fixed to the second mirror stand 2, pulleys *7a* and *7b* fixed to the apparatus body, a drive pulley 8, wires *9a* and *9b*, and a main scanning motor 10. The first and second mirror stands 1 and 2 are driven by the main scanning motor 10 by the drive pulley 8 and the wires *9a* and *9b* at a speed ratio of 2:1.

Figure 5:
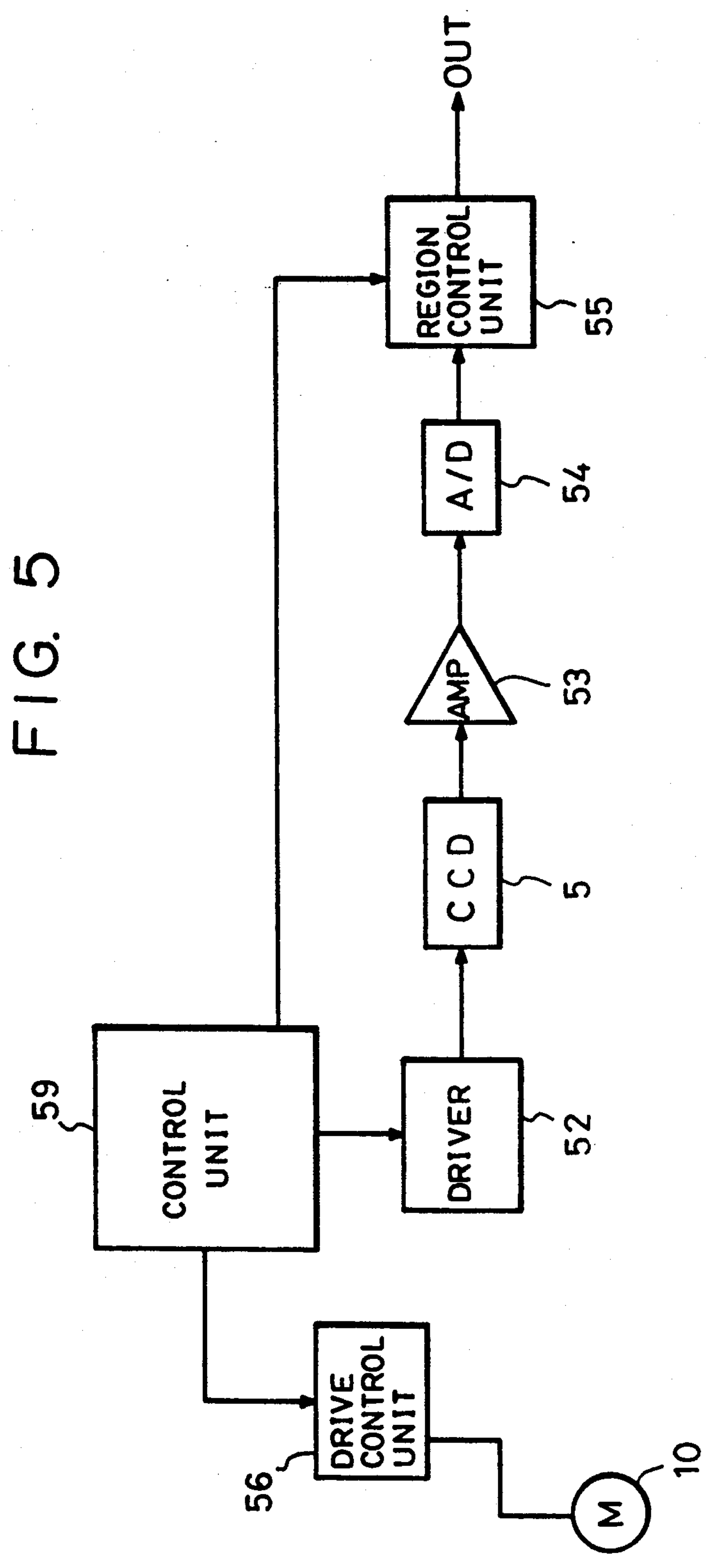
FIG. 5 is a block diagram schematically showing the circuit configuration of the image reading apparatus shown in FIG. 3.

FIG. 5 is a block diagram showing the configuration of the circuit for controlling the image reading section of the image reading apparatus of the present invention.

The circuit includes: the CCD 5 comprising a line image sensor; a driver 52 for driving the CCD 5; an amplifier 53 for amplifying the output of the CCD 5; an A/D converter 54 for sequential analog/digital conversion of the output signals from the CCD 5, which have been amplified by the amplifier 53; a region control unit 55, which sequentially selects and emits those signals which correspond to one of the output regions of the CCD, from among the signals from the A/D converter 54 and which is equipped with a gate circuit for extracting image signals, a memory for temporarily storing the signals from the A/D converter 54 for the purpose of effecting the above selective emission, etc; a drive control section 56 for controlling the main scanning motor 10 and other parts of the image reading apparatus; and a control unit 59 for performing overall control of the reading apparatus.

Figure 6:
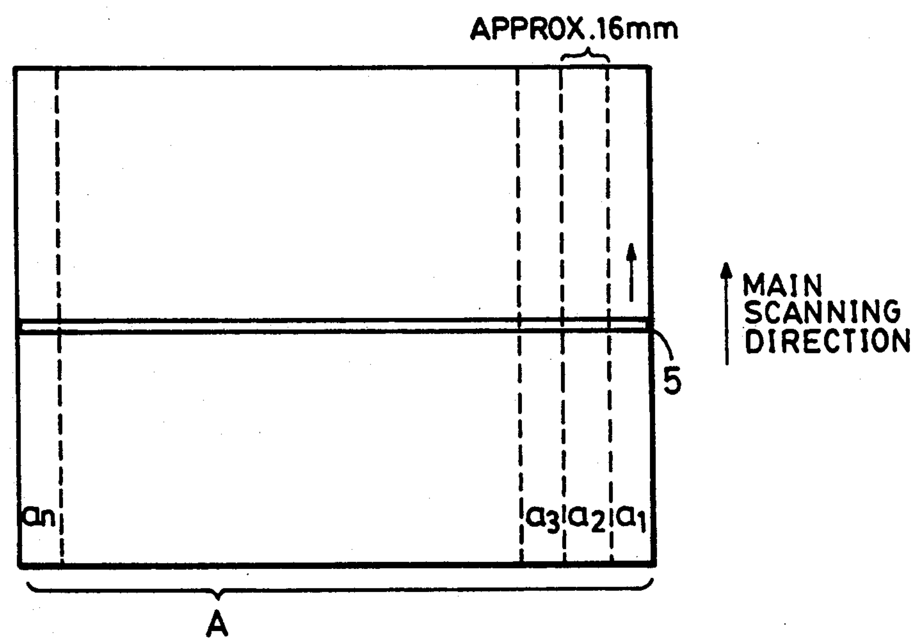
FIG. 6 is a diagram illustrating the image reading operation performed by the apparatus shown in FIG. 3.

FIG. 6 illustrates how the image reading apparatus shown in FIG. 4 performs scanning for reading.

The original is scanned by means of the first and second mirror stands 1 and 2, the projection lens 3, the fourth mirror 4, and the CCD 5, over the distance indicated by the reference symbol A in the drawing.

Assuming that the main-scanning recording width of the recording head is W (e.g., 16 mm), the original image is read by reciprocating the first and second mirrors A/W times to perform main scanning A/W times over the original. On each of the A/W readings, the region control unit 55 selects, in synchronism with the main scanning, the output of one region of the CCD 5, which one region corresponds to one of the regions: a1, a2, a3, . . ., and an, each having a width corresponding to the main-scanning recording width (approx. 16 mm) of the recording head. Thus, as the main scanning proceeds from one A/W reading to the next, the region control unit 55 sequentially emits image signals corresponding to the selected regions.

The CCD 5 is capable of reading at one time a region sufficiently larger than (more than two times) the recording width of the recording head. Thus, by sequentially selecting CCD sensor regions, each corresponding to the recording width of the recording head, from among the output signals from the CCD sensor, in synchronism with the main scanning, and by sequentially emitting data from a CCD sensor region as an image signal, it is possible to obtain image signals free from any unevenness or discontinuity attributable to inadequacy in the illumination and projection optical systems. At the same time, a reduction in operating (scanning) time can be attained by eliminating the need to move the apparatus in the sub-scanning direction.

Thus, with the reading apparatus described above, high-quality image signals can be obtained. Furthermore, the mechanism for movement in the sub-scanning direction can be eliminated, and the moving time for the sub-scanning operation omitted or reduced, thus shortening the operating time.

In the embodiment described above, image reading is performed without moving the reading position of the line image sensor CCD in the sub-scanning direction, thereby eliminating unevenness, etc. in the boundaries between adjacent main scanning areas.

However, the absence of movement in the sub-scanning direction inevitably restricts the length of the original image in the sub-scanning direction to the width of the line image sensor CCD.

Figure 7:
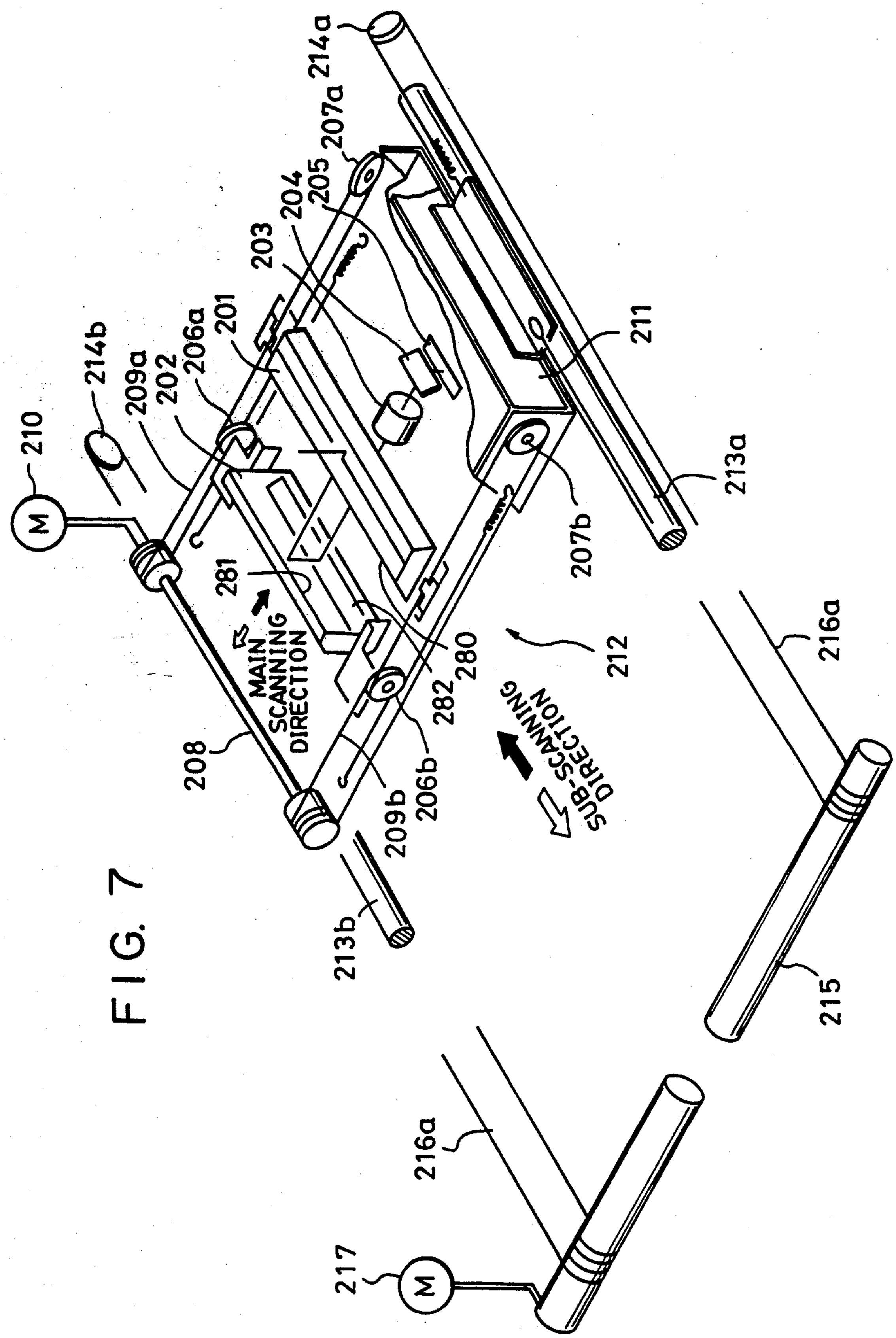
FIG. 7 is a diagram showing the structure of an image reading apparatus in accordance with another embodiment of the present invention.
Figure 8:
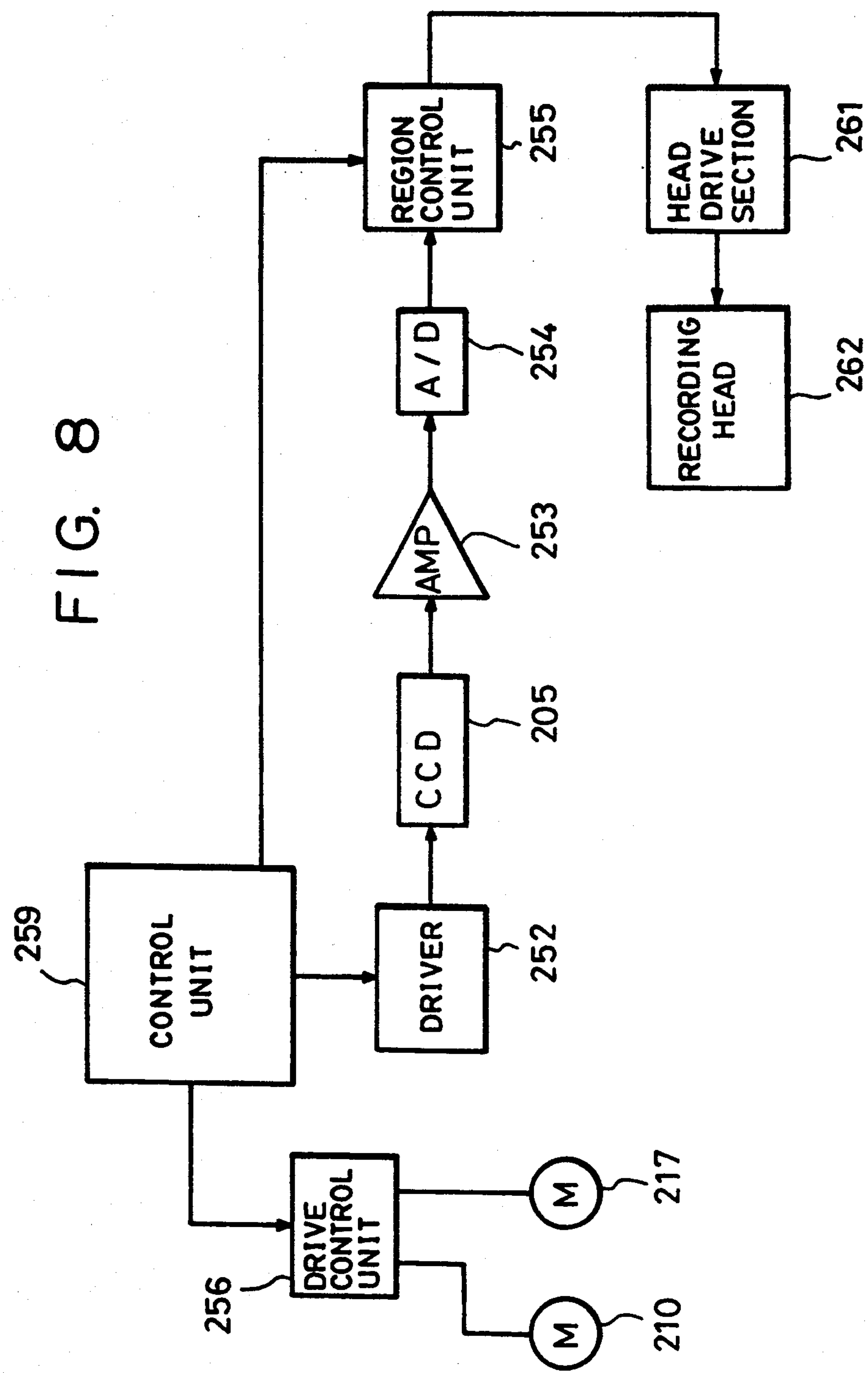
FIG. 8 is a block diagram schematically showing the circuit configuration of the image reading apparatus shown in FIG. 7.

In view of this, the following embodiment of this invention, shown in FIGS. 7 and 8, adopts a structure in which the readable range of the original image is not restricted to the width of the line image sensor CCD so that an original image of a larger size can be read while avoiding as far as possible the generation of unevenness in the boundaries between adjacent main scanning areas.

Referring to FIGS. 7 and 8, the apparatus shown includes: a first mirror stand 201 including an illumination system and a first mirror 280; a second mirror stand 202 including second and third mirrors 281 and 282; a CCD line image sensor 205 adapted to perform reading of a length which is n ($n \geqq 3$) times larger than the recording width of a recording head 262; a projection lens 203 for projecting original images onto the CCD line image sensor 205; and a fourth mirror 204 for directing the light transmitted through the projection lens 203 to the CCD line image sensor 205. A pair of scanning rails (not shown) which are fixed to a main scanning carriage 211 support the first and second mirror stands 201 and 202 in such a manner that they can move in the main scanning direction. Pulleys 206a and 206b are fixed to the second mirror stand 202, and pulleys 207a and 207b are fixed to the main scanning carriage 211. The reference numeral 208 indicates a drive pulley for driving the first and second mirror stands 201 stands 201 and 202 are driven at a speed ratio of 2:1. The reference numeral 210 indicates a main scanning motor for driving the drive pulley 208.

The main scanning carriage 211 carries the first and second mirror stands 201 and 202, the projection lens 203, the fourth mirror 204, the CCD line image sensor 205, the pulleys 207a and 207b, the drive pulley 208, the wires 209a and 209b, the main scanning motor 210, etc., and is adapted to be moved in the sub-scanning direction. Thus, the above components and the scanning carriage 211 constitute a sub-scanning system 212.

The sub-scanning system 212 is adapted to move the main scanning carriage 211 in the sub-scanning direction a distance kW equal to k ($n \geqq k \geqq 2$) times the recording width of the recording head 262 (W) at one time. Where n equals the length of CCD 205 divided by W, the width of the recording head 262. The reference numerals 213a and 213b indicate a pair of rails supporting the sub-scanning section 212 in such a manner that they can move in the sub-scanning direction. The reference numerals 214a and 214b indicate pulleys fixed to the apparatus body (not shown), 215 indicates a drive pulley for driving the sub-scanning section 212, and 216a and 216b indicate wires for driving the sub-scanning section 212. The reference numeral 217 indicates a sub-scanning motor, which drives the sub-scanning section 212 by the wires 216a and 216b and the pulleys 214a and 214b in the sub-scanning direction.

The components indicated by the reference numerals 205, 210, and 217 in FIG. 8 are identical with the components indicated by the same reference numerals in FIG. 7. Referring to FIG. 8, the apparatus shown includes a driver 252 for driving the CCD line image sensor 205, and an amplifier 253 for amplifying the output of the CCD line image sensor 205. The reference numeral 254 indicates an A/D converter for sequential A/D-conversion of the output signals from the CCD line image sensor 205, which have been amplified by the amplifier 253. The reference numeral 255 indicates a region control unit, which, when performing the m-th main scanning (m: $k \geqq m \geqq 1$), selects and reads image signals corresponding to the m-th of the n divisional regions into which the CCD line image sensor 205 is divided in the longitudinal direction. The reference numeral 256 indicates a drive control unit for controlling the main scanning motor 210, the sub-scanning motor 217, etc. The reference numeral 259 indicates a control unit for controlling the entire reading apparatus, and 261 indicates a head drive section for driving the recording head 262.

In this embodiment, the length of the reading section of the CCD line image sensor 205 is n ($n \geqq 3$) times larger than the recording width of the recording head 262. Thus, assuming that the recording width of the recording head 262 is W, the length of the reading section of the CCD line image sensor 205 can be expressed as nW, which means the main scanning is performed in a width of nW at one time. Further, since the distance the reading position of the CCD line image sensor 205 is moved in the sub-scanning direction at one time is k ($n \geqq k \geqq 2$) times larger than the recording width of the recording head 262, the distance over which sub-scanning is performed at one time can be expressed as kW (see FIG. 9).

The main scanning of the original is performed k times by the main scanning carrier 211, each scanning covering a width of nW. On the first main scanning, the region control unit 255 selects and reads an image signal corresponding to the first of the n regions of the CCD line image sensor 205, and, on the second main scanning, the region control unit 255 selects and reads an image signal corresponding to the second of the n regions of the CCD line image sensor 205. In this way, image signals respectively corresponding to the first to the k-th regions are read out. When an image signal corresponding to the k-th area has been read out by the k-th main scanning, the sub-scanning system 212 moves the main-scanning carriage 211 a distance KW, equal to k times the width of the recording head 262, W. Afterwards, the main scanning is performed in the same manner as above.

Figure 9:
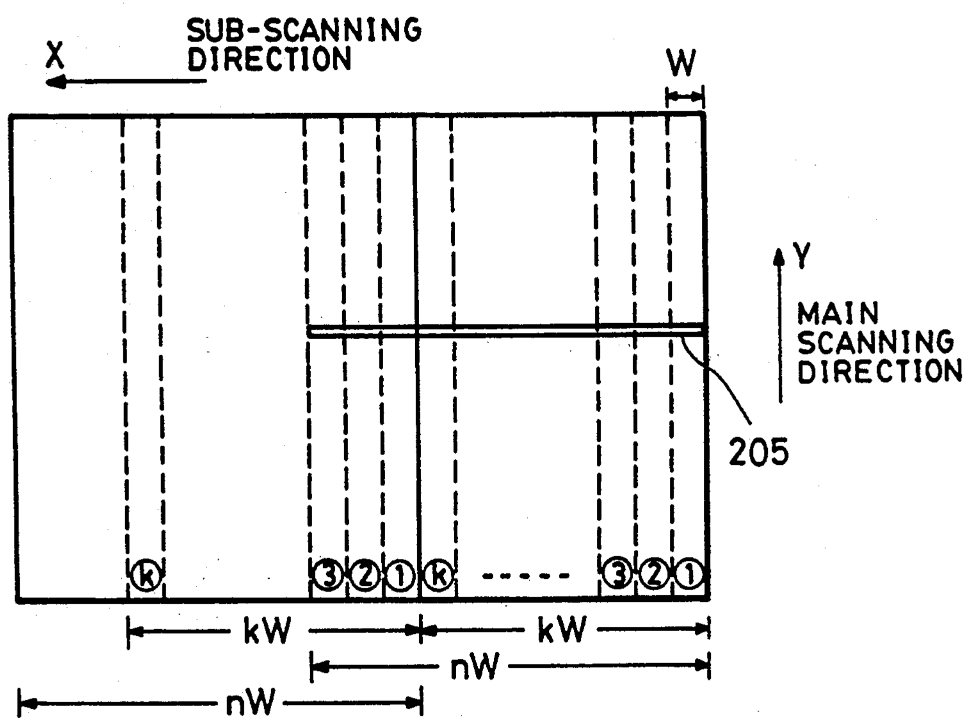
FIG. 9 is a diagram illustrating the sub-scanning and the main scanning performed by the apparatus shown in FIG. 7.

On the basis of the image signals thus read, the recording head 262 performs recording. Assuming an embodiment wherein $n > k$, the sub-scanning operations from the second iteration onwards overlap each other by a distance $(n-k)W$, as shown in FIG. 9, with the main scannings overlapping each other by the same distance. Since, however, the image signal reading is performed only up to the k-th region, no overlapping of the recording results occurs.

Constructed as described above, this embodiment makes it possible to reduce the number of times the reading position is moved in the sub-scanning direction, eliminating the unevenness and discontinuity attributable to inadequate adjustment of the illumination and projection optical systems.

Figure 10:
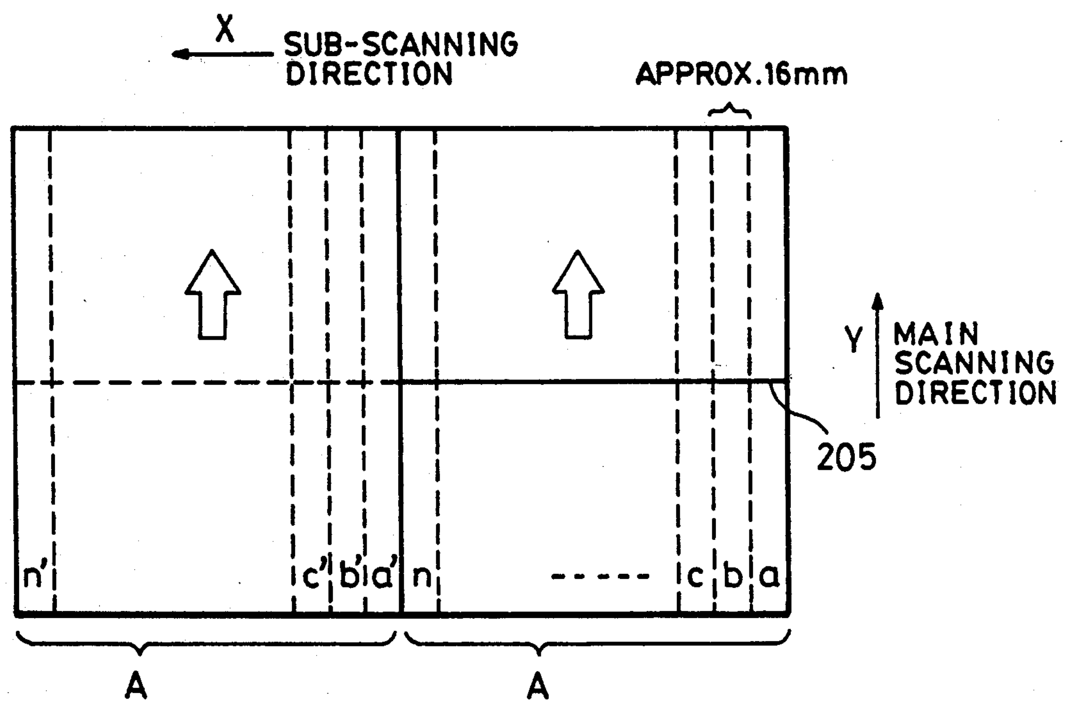
FIG. 10 is a diagram illustrating the sub-scanning and the main scanning operations in another example according to the present invention.

While in the above embodiment the sub-scanning is performed by moving the main-scanning carriage 211 in such a manner as to overlap by the distance $(n-k)W$ and the main scanning also overlaps by the same distance to successively read the image signals respectively corresponding to the first to the k-th region, it is also possible, as shown in FIG. 10, to perform sub-scanning by moving the main-scanning carriage 211 by a distance corresponding to the readable length of the reading section of the CCD line image sensor 205, i.e., by the distance nW, each time image reading corresponding to the distance $nW (=A, n=k)$ is completed by performing main scanning n times. In that case, no overlapping occurs, so that image signals corresponding to the first to the n-th region of the CCD line image sensor 205 are successively read, with image recording being performed by the recording head on the basis of the image signals thus read.

The requisite level of feeding precision in the boundary between the n-th and the a'-th scanning areas in FIG. 10 is not different from that in the prior art. Since, however, the number of times sub-scanning is performed can be reduced by a factor of 1/n, as compared to the case where sub-scanning is performed for each main scanning operation, a substantial reduction in image unevenness can be attained, thus avoiding deterioration in image quality.

In the case of an original of a size requiring no sub-scanning, i.e., an original whose width corresponds to the image length the image sensor is capable of reading at one time, no unevenness due to sub-scanning is involved, thus attaining an improvement in image quality. Further, the operating time can be much shorter.

As described above, with the image reading apparatus of the present invention, the unevenness due to multiple sub-scanning operations can be reduced to attain an improvement in image quality, and, at the same time, an original of a relatively large size can be read.

The individual components shown in outline or designated by blocks in the Drawings are all well-known in the image recording arts, and their specific construction and operation are not critical to the operation or best mode for carrying out the invention.

While the present invention has been described with reference to preferred embodiments, this should not be construed as restrictive. It goes without saying that various variations or modifications are possible without departing from the scope of the following claims.

What is claimed is:

1. An image reading apparatus of the type which reads an original image by dividing it into a plurality of stripe-like areas each having a fixed width, comprising:

reading means for reading an original a plurality of times each reading operation using a reading width which corresponds to an integral multiple of the fixed width, and for outputting image signals for each reading operation; and selection means for sequentially selecting, in synchronism with the image reading performed a plurality of times, designated image signals from among the image signals output from said reading means during each reading operation, the designated image signals corresponding to an area of said reading means having the fixed width and the designated image signals representing a different area of said reading means for each reading operation.

2. An image reading apparatus according to claim 1, wherein said reading means comprises an image sensor for reading the original using the reading width corresponding to the integral multiple of the fixed width, and moving means for moving a reading position of the image sensor a plurality of times.

3. An image reading apparatus according to claim 1, wherein the fixed width corresponds to a width of a predetermined recording image portion.

4. An image reading apparatus of the type which reads an original image by dividing it into a plurality of stripe-like areas having a fixed width, comprising:

an image sensor for reading an original using a reading width corresponding to an integral multiple of the fixed width, and for outputting image signals corresponding to the reading width;

first moving means for moving a reading position of said image sensor in a main scanning direction;

second moving means for moving the reading position of said image sensor in a sub-scanning direction each time the reading position of said image sensor has been moved a fixed plural number of times in the main scanning direction; and selection means for selecting, in synchronism with the movement of said image sensor the plural number of times in the main scanning direction, designated image signals from among the image signals output by said image sensor for the reading width, the designated image signals corresponding to an area of said image sensor having the fixed width and the designated image signals corresponding to a different area of said image sensor each time said image sensor is moved in the main scanning direction.

5. An image reading apparatus according to claim 4, wherein the fixed width corresponds to a width of a predetermined recording image portion.

* * * * *

UNITED STATES PATENT AND TRADEMARK OFFICE
CERTIFICATE OF CORRECTION

PATENT NO. : 5,283,668

DATED : February 1, 1994

INVENTOR(S) : AKIRA HIRAMATSU

It is certified that error appears in the above-identified patent and that said Letters Patent is hereby corrected as shown below:

COLUMN 5

Line 47, "stands 201" (second occurrence) should be deleted.

Line 48, "202 are" should read --202 by wires 209a and 209b. The first and second mirror stands 201 and 202 are--.

Signed and Sealed this

Twentieth Day of September, 1994

Attest:

BRUCE LEHMAN

Attesting Officer

Commissioner of Patents and Trademarks